United States Patent
Schuler et al.

(10) Patent No.: US 9,640,062 B2
(45) Date of Patent: May 2, 2017

(54) METHOD AND APPARATUS FOR FORWARDING LOCAL-ALERT MESSAGES WITHIN A COMMUNICATION SYSTEM

(71) Applicant: MOTOROLA SOLUTIONS, INC, Schaumburg, IL (US)

(72) Inventors: Francesca Schuler, Palatine, IL (US); Trent J Miller, West Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 138 days.

(21) Appl. No.: 14/747,567

(22) Filed: Jun. 23, 2015

(65) Prior Publication Data

US 2016/0379472 A1 Dec. 29, 2016

(51) Int. Cl.

| | |
|---|---|
| *G08B 1/08* | (2006.01) |
| *G08B 25/01* | (2006.01) |
| *G08B 21/02* | (2006.01) |
| *H04W 4/00* | (2009.01) |
| *H04W 4/04* | (2009.01) |
| *H04W 4/22* | (2009.01) |
| *H04W 76/00* | (2009.01) |
| *G08B 21/04* | (2006.01) |

(Continued)

(52) U.S. Cl.
CPC ........... *G08B 25/016* (2013.01); *G08B 21/02* (2013.01); *G08B 21/0438* (2013.01); *G08B 21/0446* (2013.01); *G08B 21/0453* (2013.01); *H04W 4/006* (2013.01); *H04W 4/008* (2013.01); *H04W 4/043* (2013.01); *H04W 4/22* (2013.01); *H04W 52/0254* (2013.01); *H04W 76/007* (2013.01); *H04W 4/02* (2013.01); *Y02B 60/50* (2013.01)

(58) Field of Classification Search
CPC ....... A61B 5/74; A61B 5/0024; A61B 5/0006; A61B 5/14532; A61B 5/117; A61B 5/145; G06F 19/3481; G06F 1/163; G08B 25/01; H04W 4/006; H04W 4/008; G08C 17/02
USPC ... 340/870.16, 407.1, 539.11, 539.12, 573.1, 340/870.09, 807.01
See application file for complete search history.

(56) References Cited

U.S. PATENT DOCUMENTS

| | | |
|---|---|---|
| 7,881,283 B2 | 2/2011 | Cormier et al. |
| 8,760,294 B2 | 6/2014 | Pertuit et al. |
| 8,818,829 B2 | 8/2014 | Delia |

(Continued)

FOREIGN PATENT DOCUMENTS

WO 2014145079 A1 9/2014

OTHER PUBLICATIONS

The International Search Report and The Written Opinion, Serial No. PCT/US2016/037737, filed Jun. 16, 2016, all pages.

*Primary Examiner* — Hoi Lau

(57) ABSTRACT

A method and apparatus for forwarding detected environmental conditions are provided herein. During operation, sensors will continuously sample an environment surrounding a public-safety officer. The sensors are preferably body-worn sensors, but could be vehicle or incident area sensors as well. The sensors continuously monitor and report any detected condition to a hub (which could be body-worn) as a local status alert message. Once the hub receives a detected condition within a local status alert, the hub will make a determination if a dispatch center needs to be notified of the detected condition. The notification of the condition is transmitted to the dispatch center as a global status alert, which may simply comprise a forwarded local status alert.

14 Claims, 5 Drawing Sheets

(51) Int. Cl.
*H04W 52/02* (2009.01)
*H04W 4/02* (2009.01)

(56) References Cited

U.S. PATENT DOCUMENTS

| | | |
|---|---|---|
| 8,831,698 B1 | 9/2014 | Paulis et al. |
| 2007/0257987 A1 | 11/2007 | Wang |
| 2008/0061991 A1 | 3/2008 | Urban et al. |
| 2014/0020121 A1* | 1/2014 | Berger .................... G06F 21/88 726/34 |
| 2014/0167954 A1* | 6/2014 | Johnson ............... G08B 27/001 340/539.11 |
| 2014/0320311 A1* | 10/2014 | Huang .................. H04W 4/006 340/870.09 |

* cited by examiner

METHOD AND APPARATUS FOR FORWARDING LOCAL-ALERT MESSAGES WITHIN A COMMUNICATION SYSTEM

BACKGROUND OF THE INVENTION

Next-generation public safety officers will be equipped with sensors that determine various physical and environmental conditions surrounding the public-safety officer. Similarly, public safety vehicles will be equipped with sensors and peripherals. These conditions are generally reported back to a dispatch operator so that appropriate action may be taken. For example, future police officers may have a sensor that determines when a gun is drawn. Upon detecting that an officer has drawn their gun, a notification may be sent back to the dispatch operator so that, for example, other officers in the area may be notified of the situation.

A problem with the above-described sensors is that these sensors operate in a binary fashion. For example, the dispatch center will always be notified if the officer draws his weapon. There may be situations (non-emergency scenarios) in which the dispatch center does not need to be notified of a detected condition. For example, if the officer draws his gun in order for the officer to clean the gun, it is not necessary to notify the dispatch center of this fact. In a similar manner, the officer may be at a gun range. If this is the case, it is not necessary for a sensor to report the firing of the office's gun.

Considering the above, there exists a need for systems that monitor public safety officers to prioritize any detected condition, and forward only certain prioritized conditions to a dispatch operator.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
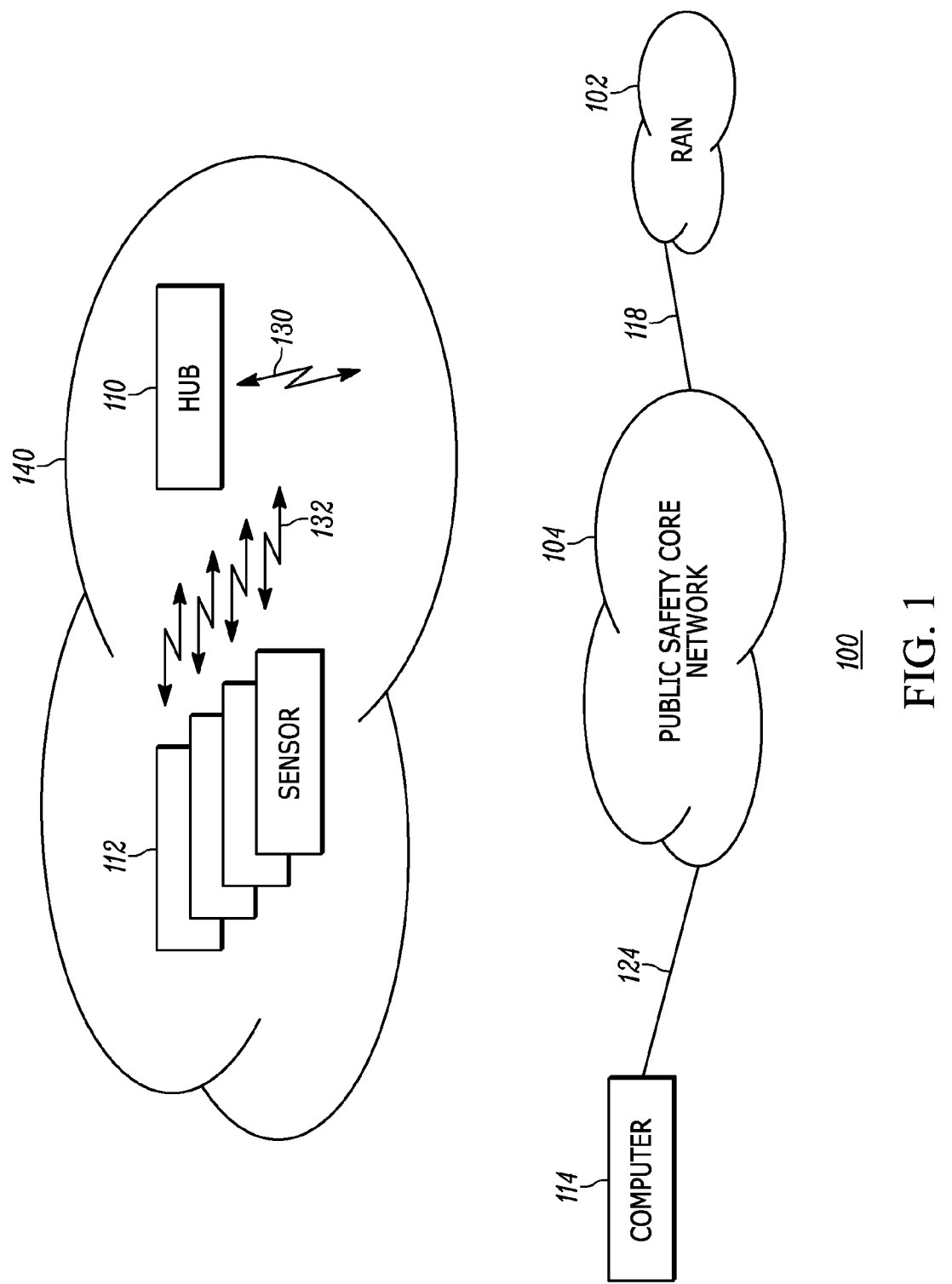
FIG. 1 depicts an example communication system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In order to address the above-mentioned need, a method and apparatus for forwarding detected environmental conditions are provided herein. During operation, sensors will continuously sample an environment surrounding a public-safety officer. The sensors are preferably body-worn sensors, but could be vehicle or incident area sensors as well. The sensors continuously monitor and report any detected condition to a hub (which could be body-worn) as a local status alert message. Once the hub receives a detected condition within a local status alert, the hub will make a determination if a dispatch center needs to be notified of the detected condition. The notification of the condition is transmitted to the dispatch center as a global status alert, which may simply comprise a forwarded local status alert.

It should be noted that while the present disclosure describes a hub notifying a dispatch center if certain conditions exist, in alternate embodiments of the present invention the hub may send a notification to mobile and non-mobile peers (shift supervisor, peers in the field, etc), the hub may also trigger automated actions, such as providing the responder with instructions on how to handle the situation, or publish dangerous condition information to the public via social media.

In at least one embodiment, the global status alert is transmitted to a dispatch center upon the hub determining that a "forwarding criteria" has been met. In addition, at least one of the local/global status alerts indicate a state of one or more sensors of one or more of the public-safety devices, a location of a public-safety officer, an identity of a public-safety officer, a status of a disarm switch or button, a status of a biometric sensor, or a status of any other sensor that may indicate an environmental condition experienced by the public-safety officer.

In yet another embodiment, the global-alert message will comprise a flag that indicates whether information contained within the global-alert message is displayed in a back-end application. For example an agency may choose as a policy to log the fact that data was de-prioritized (until a re-arm or re-holster). Therefore, even if events get forwarded from the Hub device to the server, an indicator or flag may be added so that an application (e.g. CAD, mapping application, etc.) querying for emergency or relevant data, would not receive the data.

In at least one embodiment, at least one of the local or global status alerts indicates one or more output values from one or more analytics, and the forwarding criteria is based on the indicated one or more output values from the one or more analytics.

In at least one embodiment, at least one of the local or global status alerts indicates a state of at least one of the public-safety responders, and the forwarding criteria is based on the indicated state of the at least one public-safety responder.

In at least one embodiment, at least one of the local or global status alerts indicates incident-definition data; the forwarding criteria is based on the indicated incident-definition data, which itself includes one or more of recentness of incident creation, incident type, an indication of users or equipment assigned to the incident, and incident location.

In at least one embodiment, the forwarding criteria is based on a severity level of one or more of the status alerts, a status of a disarm button, an identification of one or more of a weapon, an object of interest, a person of interest, a voice of interest, a word of interest, a phrase of interest, a location of interest, a building of interest, a vehicle of interest, a situation of interest, a stress level of one or more individuals a user-profile record that is associated with the public-safety communication device, a user identity, an agency affiliation, an agency role, an incident role, a rank, a group identifier, a hierarchical relationship, or data indicative of a rule set associated with the user-profile record. In at least one such embodiment, at least part of the rule set is user-configurable.

Before proceeding with the detailed description of the figures, it is explicitly noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as constructively preceded by a clause such as "In at least one embodiment, . . . ." And it is for reasons akin to brevity and clarity of presentation that this implied leading clause is not repeated in the following detailed description of the figures.

FIG. 1 depicts an example communication system 100 that includes one or more radio access networks (RANs) 102, a public-safety core network 104, hub 110, local sensors 112, a computer 114, and communication links 118, 124, and 132. In a preferred embodiment of the present invention, hub 110 and sensors 112 form a body-area network, or a local area network 140, with communication links 132 between sensors 112 and hub 110 taking place utilizing a short-range communication system protocol such as a Bluetooth communication system protocol.

Each RAN 102 includes typical RAN elements such as base stations, base station controllers (BSCs), routers, switches, and the like, arranged, connected, and programmed to provide wireless service to user equipment (e.g., hub 110, and the like) in a manner known to those of skill in the relevant art.

The public-safety core network 104 may include one or more packet-switched networks and/or one or more circuit-switched networks, and in general provides one or more public-safety agencies with any necessary computing and communication needs, transmitting any necessary public-safety-related data and communications.

The hub 110 may be any suitable computing and communication devices configured to engage in wireless communication with the RANs 102 over the air interface 130 as is known to those in the relevant art. Moreover, one or more hub 110 are further configured to engage in wired and/or wireless communication with one or more local sensor 112 via the communication link 132. Hub 110 will be configured to determine when to forward information via RANs 102 based on a combination of sensor 112 inputs.

Sensors 112 may comprise any device capable of generating a current context. For example, sensors 112 may comprise a GPS receiver capable of determining a location of the user device, a clock, calendar, environmental sensors (e.g. a thermometer capable of determining an ambient temperature, humidity, presence of dispersed chemicals, radiation detector, etc.), an accelerometer, a barometer, speech recognition circuitry, a user's electronic calendar, short-range communication circuitry (e.g., Bluetooth™ circuitry) to determine what other electronic devices are near, a gunshot detector, a gun-drawn detector, a mobile audio or video analytic, a disarm sensor (switch/button), . . . , etc.

Any one or more of the communication links 118, 124, 130, 140 could include one or more wireless-communication links and/or one or more wired-communication links.

Finally, computer 114 is part of a computer-aided-dispatch center, manned by an operator providing necessary dispatch operations. For example, computer 114 typically comprises a graphical user interface that provides the dispatch operator necessary information about public-safety officers. As discussed above, much of this information originates from sensors 112 providing information to hub 110, which forwards the information to RAN 102 and ultimately to computer 114.

Figure 2:
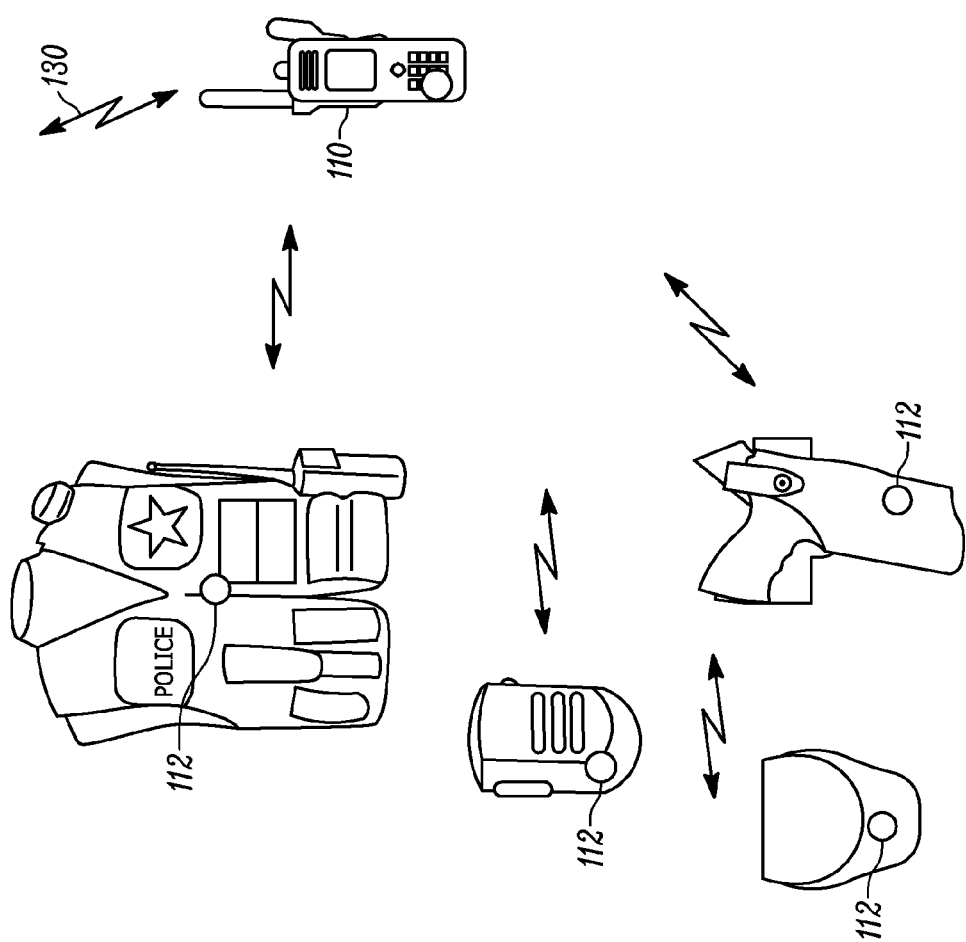
FIG. 2 depicts a more-detailed view of the personal-area network of FIG. 1.

FIG. 2 depicts a more-detailed view of the personal-area network of FIG. 1. Personal-area network comprises a very local-area network that has a range of, for example 10 feet. As shown in FIG. 2, various sensors 112 are shown attached to equipment utilized by a public-safety officer. In this particular example, a bio-sensor is located within a police vest, a voice detector is located within a police microphone, a handcuff deployment sensor is located with a handcuff pouch, a gun-draw sensor is located within a holster, and a disarm sensor is located within hub 110. In FIG. 2, all sensors are represented by circles attached to an item to be monitored.

As discussed above, sensors 112 and hub 110 form a personal-area network (LAN) 140. LAN 140 preferably comprises a Bluetooth piconet. Sensors 112 and hub 110 are considered Bluetooth devices in that they operate using a Bluetooth, a short range wireless communications technology at the 2.4 GHz band, commercially available from the "Bluetooth special interest group". Sensors 112 and hub 110 are connected via Bluetooth technology in an ad hoc fashion forming a piconet. Hub 110 serves as a master device while sensors 112 serve as slave devices. Sensors 112 notify hub 110 of a sensed condition by sending a local status alert transmitted from the sensor as a Bluetooth message. Hub 110 in turn, may forward the local status alert over a wide-area network (e.g., RAN/Core Network) to computer 114. In alternate embodiments of the present invention, hub 110 may forward the local status alert to mobile and non-mobile peers (shift supervisor, peers in the field, etc), or to the public via social media.

As discussed above, a problem exists with prior-art sensor in that the sensor network operates in a binary fashion. For example, dispatch center (computer 114) will always be notified by hub 110 if the officer draws his weapon. There may be situations in which the dispatch center does not need to be notified of a detected condition. For example, if the officer draws his gun in order for the officer to clean the gun, it is not necessary to notify the dispatch center of this fact.

In order to address this issue, once the hub receives a detected condition within a local status alert, the hub will make a determination if a dispatch center needs to be notified of the detected condition. The notification of the condition is transmitted to the dispatch center as a global status alert, which may simply comprise a forwarded local status alert.

It should be noted that the decision to forward a local status alert to computer 114 may be made based on a detected condition of multiple sensors. For example, one sensor 112 may comprise a disarm sensor. The disarm sensor may simply comprise a switch, that when activated or pressed, indicates to hub 110 to ignore a received gun-drawn alert from a gun-drawn sensor. Another sensor 112 may comprise location-finding equipment (e.g., a GPS receiver) in order to instruct hub 110 to ignore a received gun-drawn alert from a gun-drawn sensor, for example when an officer enters court, police headquarters, or a washroom.

Expanding on the above, a disarm sensor 112 is provided in FIG. 2 existing, or attached to hub 110. It should be noted that disarm sensor 112 may be located on any device or piece of clothing worn by a public-safety officer. When disarm sensor 112 is activated, hub 110 will discard telemetry information (i.e., discard local status alert messages) from select sensors. In an alternate embodiment, hub 110 may store information within the local status alert message, but fail to forward the information when a disarm sensor 112 has been activated.

In a preferred embodiment, power savings may be achieved by various sensors by hub 110 sending the sensor a sleep message when hub 110 receives a disarm message from a disarm sensor. For example, if a disarm message is received by hub 110 from a disarm sensor, all sensors 112 may be notified of this fact, and may in turn, enter a sleep mode until manually powered on again, stop transmitting status messages, or only transmit high-priority status messages.

Sensors operating in a power-savings mode may again operate normally after certain conditions are met. In this scenario, only certain sensors are instructed to operate in a low-power state. Other sensors may be operating normally. As an example, a location detector may always be operating to determine an officer's location. A condition detected by a first sensor (e.g., location sensor) may cause hub 110 to instruct all other sensors to operate normally, which may include alteration of the hub's message retention policy and/or the power state of sensors and peripherals associated with the hub. This may be accomplished, via a Bluetooth message instructing sensors 112 to begin normal operations (wake up). For example, the detection of a disarm button being pressed, may cause hub 110 to send a sleep message to a first group of sensors. If a location sensor detects that the officer has entered a dangerous location, it may report this information to hub 110. Hub 110, may in response, send a power-up message to the first group of sensors.

As an example of the above, consider the scenario where a police officer returns home for the evening and wishes to remove a weapon from its holster. A disarm button may be provided that upon pressing, a "full disarm" of all sensors is performed by hub 110 sending a power down command to all the sensors, disconnect them from the hub 110 (remove them from the body-area network), or keep the sensors connected but not forward any received sensor data.

Again pressing the disarm button causes a "temporary override" where any events sent to hub 110 are stored by hub 110 (logged) but don't get pushed to the dispatcher until a "re-holster" event is detected by a holster sensor or alternatively until a predetermined amount of time has passed.

Figure 3:
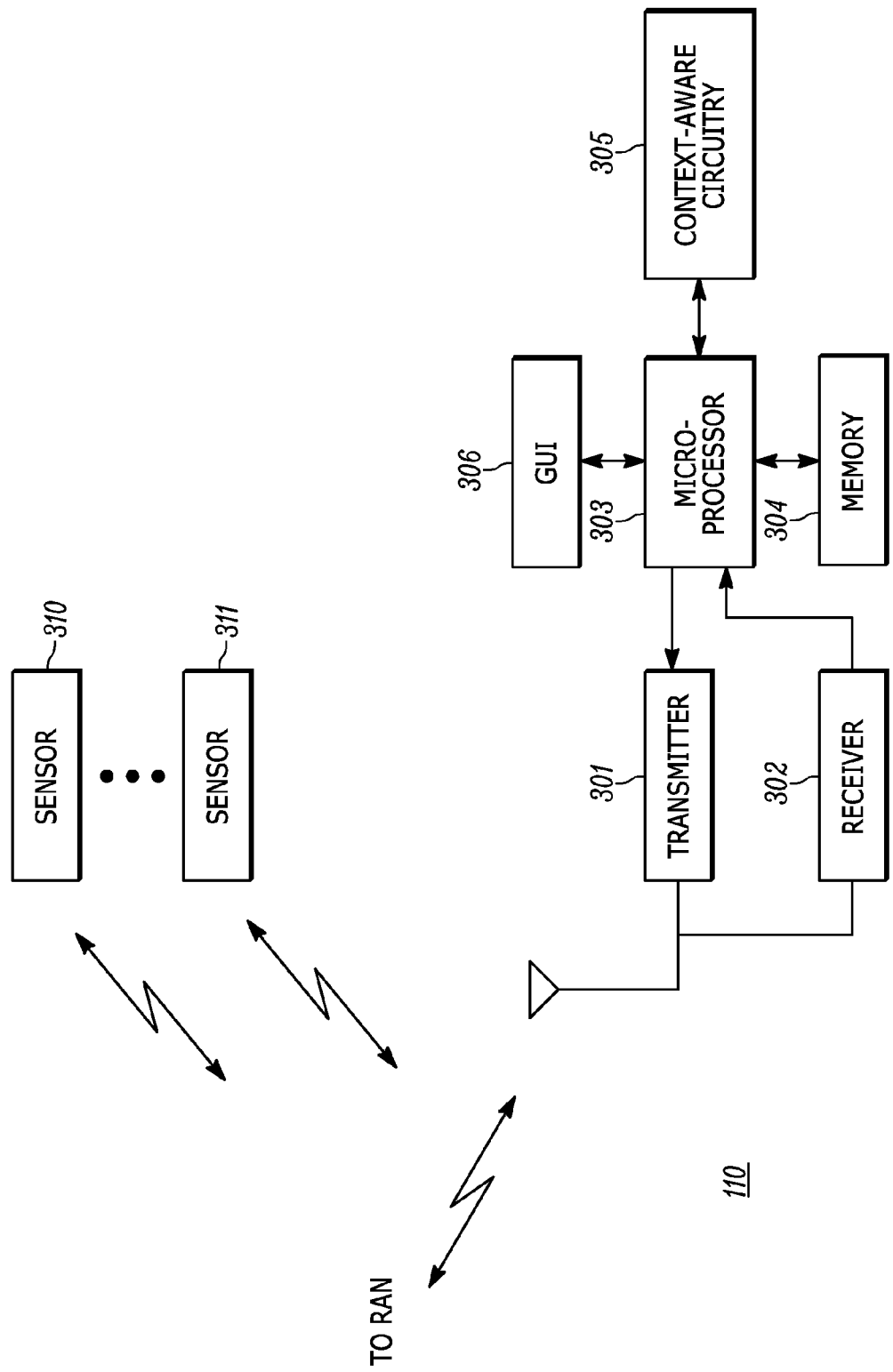
FIG. 3 is a block diagram of the hub of FIG. 1 and FIG. 2.

FIG. 3 is a block diagram of the hub of FIG. 1 and FIG. 2. As shown, hub 110 may include transmitter 301, receiver 302 (which may be wired or wireless), display 306, logic circuitry 303, and memory 304. In other implementations, hub 110 may include more, fewer, or different components.

Transmitter 301 and receiver 302 may be well known long-range and/or short-range transceivers that utilize any number of network system protocols. For example, transmitter 301 and receiver 302 may be configured to utilize Bluetooth communication system protocol for a body-area network, a private 802.11 network, a next-generation cellular communications protocol operated by a cellular service provider, or any public-safety protocol such as an APCO 25 network or the FirstNet broadband network. Although only a single transmitter and receiver are shown in FIG. 3, one of ordinary skill in the art will recognize that multiple transmitters and receivers may exist in hub 110 to provide simultaneous communications using any number of communication system protocols.

GUI 306 provides a way of conveying (e.g., displaying) sensor information to the user. In a particular embodiment, a status of each sensor 310-311 may be displayed for a user. The status may indicate whether or not the sensor is detecting a dangerous condition, the sensor is in a sleep mode, and/or whether or not the sensor is disarmed.

Context-aware circuitry 305 preferably comprises device capable of generating a current time and location of hub 110. For example, context-aware circuitry 305 may comprise a GPS receiver.

Logic circuitry 303 comprises a digital signal processor (DSP), general purpose microprocessor, a programmable logic device, or application specific integrated circuit (ASIC) and is configured to determine whether or not to forward local status-alert messages received from sensors 310-311. For example, a local status alert message may have been received from sensor 310 by receiver 302 and passed to logic circuitry 303. If, for example, the local status alert message indicated that a gun had been drawn, microprocessor 303 may store this information in memory 304 with time and location information (received from circuitry 305), and forward the local status-alert message via transmitter 301. If, however, a second local-alert message received from sensor 311 comprises a disarm message, logic circuitry 303 may choose not to forward the local status-alert message. Additionally, in response to the disarm message being received, logic circuitry 303 may instruct transmitter 301 to send a message to various sensors instructing them to operate in a low-power mode. If certain conditions are met, logic circuitry 303 may instruct transmitter 301 to transmit a power-up command to all sensors operating in a low-power mode.

Figure 4:
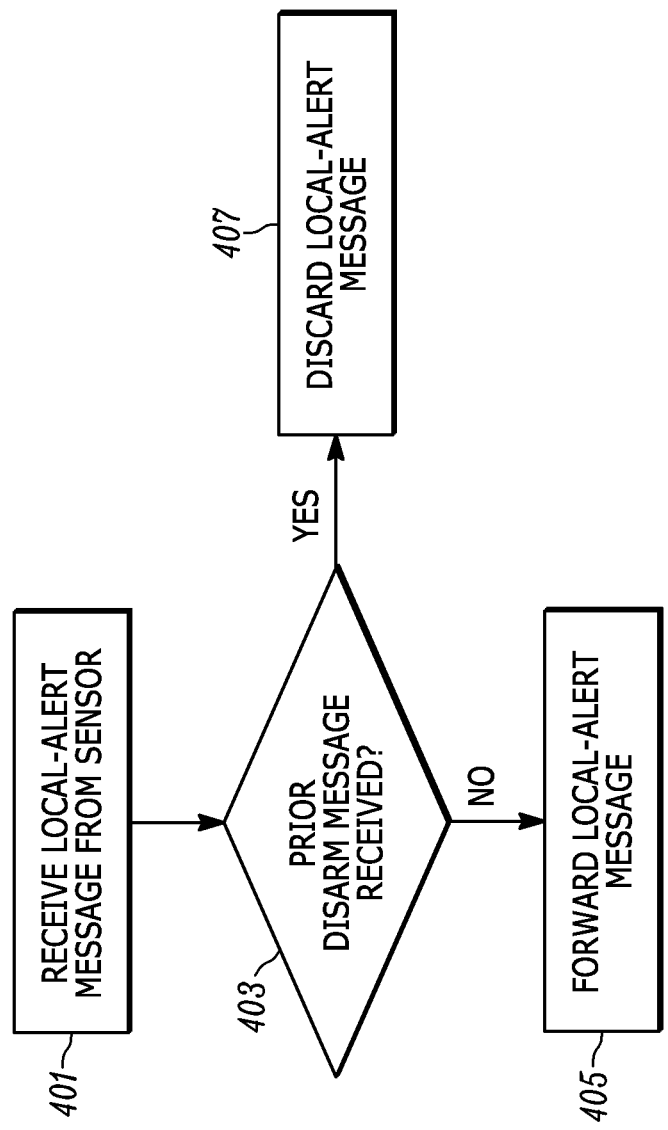
FIG. 4 is a flow chart showing operation of the hub of FIG. 3.

FIG. 4 is a flow chart showing operation of the hub of FIG. 3. In particular, the logic flow of FIG. 4 illustrates those steps (not all necessary) taken by hub 110 when determining whether or not to forward a local status-alert message. The logic flow begins at step 401 where receiver 302 receives a local-alert message from a sensor over a personal-area network and forwards the message to logic circuitry 303. The logic flow continues to step 403 where it is determined by logic circuitry 303 if a prior disarm message is received from any sensor over the personal-area network. If not, the logic flow continues to step 405 where the local-alert message is forwarded over a wide-area network, and preferably to computer 114. If so, the local-alert message is not forwarded, and instead discarded (step 407). It should be noted that after both steps 405 and/or 407, information within the local-alert message may be stored in internal storage 304.

Figure 5:
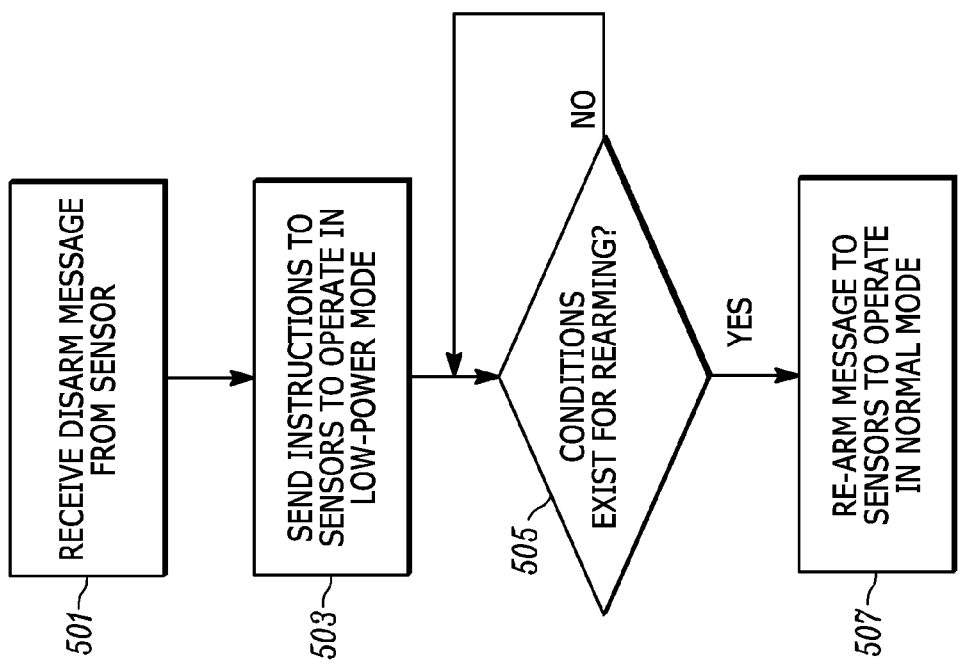
FIG. 5 is a flow chart showing operation of the hub of FIG. 3.

FIG. 5 is a flow chart showing operation of the hub of FIG. 3. In particular, the logic flow of FIG. 5 illustrates those steps (not all necessary) taken by hub 110 when determining whether or not to operate certain sensors in a disarmed state (e.g., a low-power state). The logic flow begins at step 501 where a disarm message is received by receiver 302 and forwarded to logic circuitry 303. As discussed above, the disarm message is preferably received from a sensor whose sole purpose is to disarm other sensors within a body-area network, or a personal-area network. The "disarm sensor" may simply comprise a switch, that when activated, sends a disarm message to hub 110. At step 503, logic circuitry 303 instructs transmitter 301 to transmit instructions to other sensors operating on the body-area network to operate in a low-power mode. Logic circuitry 303 also determines whether or not conditions exist for rearming the body-area network (step 505). These conditions may be:

- logic circuitry 303 determining from context-aware circuitry 305 that hub 110 has entered a dangerous geographic area having, for example, a higher-than normal crime rate, or a crime rate above a predetermined threshold;
- logic circuitry 303 determining that a local alert has indicated that a gun has been re-holstered;
- analytic information has detected a dangerous sound, such as a gunshot in the area, screams, or the sounds of a vehicle crash
- analytic information has detected a dangerous image, such as a wanted person or vehicle
- the user has been assigned to an incident or task
- the user has signed into or out of her/his device
- the user's supervisor or authorized user has requested a re-arm If, at step 505, it has been determined that conditions exist for rearming the body-area network, then the logic flow continues to step 507 where logic circuitry 303 instructs transmitter 301 to transmit a message to those sensors operating in a low-power state. The message instructs those sensors operating in the low-power state to operate in a normal-power mode.

The above-described text provides for a method for forwarding local-alert messages within a communication system. During execution, a receiver is provided to receive a local-disarm message at a body-worn hub from a body-worn sensor, wherein the body-worn hub and the body-worn sensor are part of a personal-area network. A local-alert message is received by the receiver over the personal-area network and a determination is made whether or not to forward information contained within the local-alert message over a wide-area network. The determination is based on whether or not the local-disarm message was received by the body-worn hub, such that the information contained within the local-alert message is forwarded over the wide-area network if the local-disarm message was received, otherwise the information contained within local-alert message is discarded without forwarding the information contained within local-alert message over the wide-area network.

As discussed, a determination may be made if conditions exist for forwarding the information contained within the local-alert message, and the information contained within the local-alert message may be forwarded over the wide-area network even if the local-disarm message was received, so long as conditions exist for forwarding the information contained within the local-alert message.

A current location may be determined, and the conditions exist for forwarding the information contained within the local-alert message may be based on the current location As discussed above, instructions may be sent to other sensors within the personal-area network to enter a low-power state when the local-disarm message is received, and if conditions exist for re-arming the other sensors within the personal-area network, a re-arm message will be sent to the other sensors within the personal-area network, wherein the re-arm message causes the other sensors within the personal-area network to exit the low-power state. Again, a current location may be determined, and the conditions exist for re-arming the other sensors within the personal-area network based on the current location As discussed above, the information contained within the local-alert message may be stored within local storage if the local-disarm message was not received, otherwise the information contained within the local-alert message may be discarded.

The above-described text also describes a method that provides a receiver configured to receive a local-disarm message at a body-worn hub, received from a body-worn sensor, wherein the body-worn hub and the body-worn sensor are part of a personal-area network. Instructions are sent to other sensors within the personal-area network to enter a low-power state when the local-disarm message is received at the body-worn hub;

As discussed, a determination may be made if conditions exist for re-arming the other sensors within the personal-area network, instructions will be sent to other sensors within the personal-area network to enter a high-power state when conditions exist for re-arming the other sensors within the personal-area network. These conditions may be based on a current location Finally, the above text provides for a body-worn hub that comprises a receiver configured to receive a local-disarm message at a body-worn hub from a body-worn sensor, wherein the body-worn hub and the body-worn sensor are part of a personal-area network. The body-worn hub also comprises logic circuitry configured to determine whether or not to forward information contained within the local-alert message over a wide-area network, wherein the determination whether or not to forward the information contained within the local-alert message is based on whether or not the local-disarm message was received by the body-worn hub. Finally, the body-worn hub comprises a transmitter configured to forward the information contained within the local-alert message over the wide-area network if the local-disarm message was received, otherwise the logic circuitry discards the information contained within local-alert message without forwarding the information contained within local-alert message over the wide-area network.

The body-worn hub may additionally comprise context-aware circuitry configured to determine a current location, and wherein the conditions exist for forwarding the information contained within the local-alert message based on the current location In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for forwarding local-alert messages within a communication system, the method comprising the steps of:
    providing a receiver configured to receive a local-disarm message at a body-worn hub from a body-worn sensor, wherein the body-worn hub and the body-worn sensor are part of a personal-area network;
    receiving by the receiver, a local-alert message over the personal-area network, wherein the local-alert message is generated from a gun-draw sensor that is part of the personal-area network;
    determining by the body-worn hub, whether or not to forward information contained within the local-alert message over a wide-area network, wherein the determination whether or not to forward the information contained within the local-alert message is based on whether or not the local-disarm message was received by the body-worn hub;
    forwarding the information contained within the local-alert message over the wide-area network if the local-disarm message was not received, otherwise discarding the information contained within local-alert message without forwarding the information contained within local-alert message over the wide-area network.

2. The method of claim 1 further comprising the steps of:
    determining if conditions exist for forwarding the information contained within the local-alert message;
    and forwarding the information contained within the local-alert message over the wide-area network if the local-disarm message was not received, and if conditions exist for forwarding the information contained within the local-alert message.

3. The method of claim 2 further comprising the steps of:
    determining a current location;
    and wherein the conditions exist for forwarding the information contained within the local-alert message based on the current location.

4. The method of claim 1 further comprising the step of:
    sending instructions to other sensors within the personal-area network to enter a low-power state when the local-disarm message is received.

5. The method of claim 4 further comprising the steps of:
    determining if conditions exist for re-arming the other sensors within the personal-area network;
    and sending, by the body-worn hub, a re-arm message to the other sensors within the personal-area network when the conditions exist for rearming the other sensors, wherein the re-arm message causes the other sensors within the personal-area network to exit the low-power state.

6. The method of claim 5 further comprising the steps of:
determining a current location;
and wherein the conditions exist for re-arming the other sensors within the personal-area network based on the current location.

7. The method of claim 1 further comprising the steps of:
storing the information contained within the local-alert message within local storage if the local-disarm message was not received, otherwise discarding information contained within the local-alert message.

8. A method comprising the steps of:
providing a receiver configured to receive a local-disarm message at a hub, received from a body-worn sensor, wherein the hub and the body-worn sensor are part of a personal-area network;
sending instructions to other sensors within the personal-area network to enter a low-power state when the local-disarm message is received at the body-worn hub;
receiving by the receiver, a local-alert message over the personal-area network, wherein the local-alert message was generated by a gun-draw sensor that is part of the personal-area network;
determining by the hub, whether or not to forward information contained within the local-alert message over a wide-area network, wherein the determination whether or not to forward the information contained within the local-alert message is based on whether or not the local-disarm message was received by the hub;
forwarding the information contained within the local-alert message over the wide-area network if the local-disarm message was not received, otherwise discarding the information contained within local-alert message without forwarding the information contained within local-alert message over the wide-area network.

9. The method of claim 8 further comprising the steps of:
determining if conditions exist for re-arming the other sensors within the personal-area network;
and sending instructions to other sensors within the personal-area network to enter a high-power state when conditions exist for re-arming the other sensors within the personal-area network.

10. The method of claim 9 further comprising the steps of:
determining a current location;
and wherein the conditions exist for re-arming the other sensors within the personal-area network based on the current location.

11. The method of claim 8 further comprising the steps of:
storing the information contained within the local-alert message within local storage if the local-disarm message was not received, otherwise discarding information contained within the local-alert message.

12. A hub comprising:
a receiver configured to receive a local-disarm message from a body-worn sensor, wherein the body-worn hub and the body-worn sensor are part of a personal-area network;
logic circuitry configured to determine whether or not to forward information contained within the local-alert message over a wide-area network, wherein the determination whether or not to forward the information contained within the local-alert message is based on whether or not the local-disarm message was received by the hub;
a transmitter configured to forward the information contained within the local-alert message over the wide-area network if the local-disarm message not was received, otherwise the logic circuitry discards the information contained within local-alert message without forwarding the information contained within local-alert message over the wide-area network.

13. The hub of claim 12 wherein:
the logic circuitry is also configured to determine if conditions exist for forwarding the information contained within the local-alert message;
and the transmitter is configured to forward the information contained within the local-alert message over the wide-area network if the local disarm message was not received, and if conditions exist for forwarding the information contained within the local-alert message.

14. The hub of claim 13 further comprising:
context-aware circuitry configured to determine a current location;
and wherein the conditions exist for forwarding the information contained within the local-alert message based on the current location.

\* \* \* \* \*